United States Patent [19]

Modat

[11] Patent Number: 4,566,716
[45] Date of Patent: Jan. 28, 1986

[54] DEVICE FOR CONNECTING A TRACTOR TO A SEMITRAILER

[75] Inventor: Bernard Modat, Villette de Vienne, France

[73] Assignee: Renault Vehicules Industriels, Lyons, France

[21] Appl. No.: 571,070

[22] Filed: Jan. 16, 1984

[30] Foreign Application Priority Data

Jan. 14, 1983 [FR] France ................................ 83 00530

[51] Int. Cl.[4] ............................................. B62D 53/08
[52] U.S. Cl. ..................................................... 280/439
[58] Field of Search ........... 280/433, 439, 440, 405 A, 280/406 R, 423 R, 718

[56] References Cited

U.S. PATENT DOCUMENTS

| | | | |
|---|---|---|---|
| 2,968,496 | 1/1961 | Gouirand | 280/439 |
| 3,257,124 | 6/1966 | Mendez | 280/439 |
| 3,486,768 | 12/1969 | Masser | 280/440 |
| 4,029,335 | 6/1977 | Cady et al. | 280/439 |
| 4,149,606 | 4/1979 | Hawk | 180/14.1 |

FOREIGN PATENT DOCUMENTS

| | | | |
|---|---|---|---|
| 743710 | 3/1933 | France | 280/439 |
| 1324996 | 7/1963 | France | 280/439 |
| 2306861 | 5/1976 | France | 280/439 |
| 196824 | 5/1923 | United Kingdom | 280/439 |
| 199890 | 7/1923 | United Kingdom | 280/439 |
| 2037685 | 7/1980 | United Kingdom | 280/439 |

Primary Examiner—Joseph F. Peters, Jr.
Assistant Examiner—Mark C. Dukes
Attorney, Agent, or Firm—Oblon, Fisher, Spivak, McClelland & Maier

[57] ABSTRACT

A tractor-semitrailer connecting device, includes, in a usual way, a fifth wheel connected to the tractor and suited to receive the complementary support element of the semitrailer. Fifth wheel 15 is directly supported and suspended on rear axle 2 of the tractor whose frame is, in a usual way, suspended by springs 6 on the rear axle 12 of this tractor. Application is to the improvement of the quality and comfort of suspension of the tractor and its cab and to the decoupling of the vibrations transmitted to the frame from this tractor.

4 Claims, 1 Drawing Figure

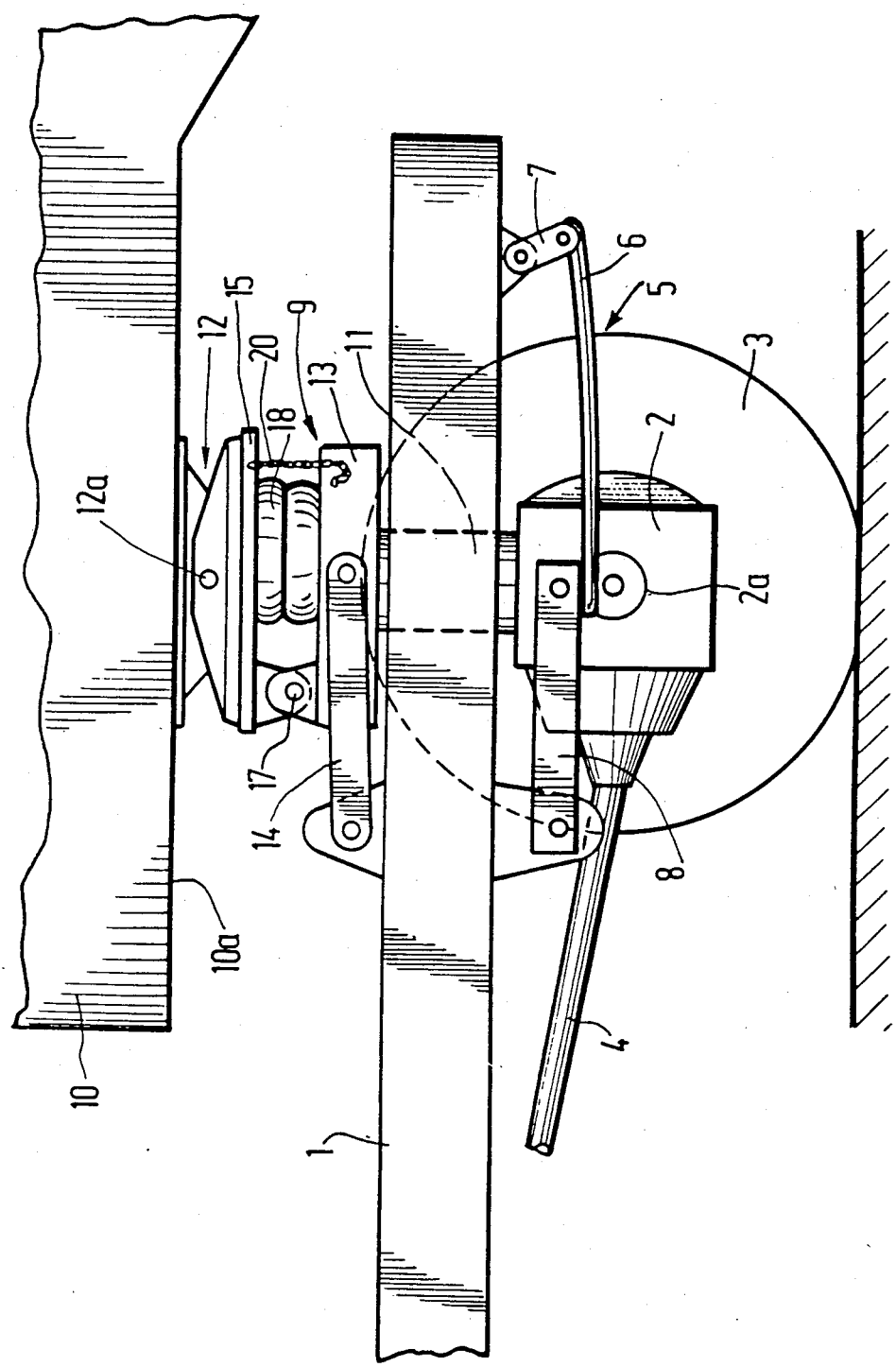

DEVICE FOR CONNECTING A TRACTOR TO A SEMITRAILER

BACKGROUND OF THE INVENTION

1. Field of the Invention

This invention relates to a device for connecting a tractor to a semitrailer, this device using, in a known manner, a fifth wheel fixed to the tractor, on which the front part of the semitrailer rests.

2. Description of the Prior Art

It is known that the suspension of a tractor and semitrailer combination must take into account contradictory conditions: to provide satisfactory holding of the road regardless of the load of the rig and, in addition, provide suspension for the tractor traveling by itself as well as for the fully loaded rig which calls for a sufficiently stiff suspension.

Moreover, tractors with semitrailers are subjected, during traveling, to a movement called "curling". This movement corresponds to a gallop of the rig and proves detrimental to the comfort of the cab with regard to vibrations.

Detailed studies have shown that the semitrailer, by its characteristics of weights, inertias and suspension stiffnesses, is the cause of this curling movement.

Insulating the body of the semitrailer from the tractor frame by a suspension stage has not made it possible to overcome this problem. To suspend the semitrailer in this way amounts to a decoupling of the vibratory movements of the tractor and those of the semitrailer. This is equivalent, for the vehicle, to rolling empty and therefore results in a very disagreeable dynamic behavior.

SUMMARY OF THE INVENTION

The tractor-semitrailer connecting device according to the invention, comprises in a usual way, a fifth wheel connected to the tractor and suited to receive the complementary support element of the semitrailer. The fifth wheel is directly supported and suspended on the rear axle of the tractor whose frame is, in a usual way, suspended by springs on the rear axle of this tractor.

According to another characteristic of the invention, the fifth wheel is articulated around a transverse shaft with a base fastened directly to the axle by at least a column passing through the frame of the tractor, a suspension stage being placed between the fifth wheel and said base.

Advantageously, the suspension of the rear axle of the tractor on the frame includes, on each side, a half leaf spring connected by its rear part to the frame by small links, and fastened by its front part to a link whose front end is, in turn, connected to the frame, while arms approximately parallel to said links connect, in an articulated way, the base to the frame.

As a result of these arrangements, the frame of the tractor is insulated from the undesirable movements of the semitrailer.

BRIEF DESCRIPTION OF THE DRAWING

Other objects, characteristics and advantages of the invention will come out of the following description, given only by way of nonlimiting example, with reference to the accompanying drawing whose single FIGURE is a schematic view in elevation of an embodiment of the connecting device according to the invention.

DETAILED DESCRIPTION OF THE PREFERRED EMBODIMENT

The tractor, not show in its entirety, includes a frame 1 and, on the rear part of this frame, a driving axle 2 for driving the driving wheel 3, (the left set of wheels has been removed for greater clarity). A drive shaft 4 goes to the power unit (now shown).

Axle 2 is suspended on frame 1 by suspension elements 5, here each comprising a half leaf spring 6 connected at the rear, by a small link 7, to the frame and fastened in front to the rear part of a link 8, itself connected in front to frame 1 and fastened to axle tube 2a.

A fifth wheel 9 which, in a usual way, receives complementary support element 12 of semitrailer 10, is fastened directly to axle 2 by columns 11.

Fifth wheel 9 comprises a base 13 fastened to the upper part of columns 11 and connected to the frame 1 by arms 14, approximately parallel to links 8. A plate 15, forming the fifth wheel itself, is located above base 13 and is articulated to the base 13 around a transverse shaft 17 extending parallel to axle 2; this plate 15 is set at a distance from base 13, and a suspension stage 18 consisting, for example, of an air cushion, occupies the space existing between plate 15 and base 13.

When semitrailer 10 rests on fifth wheel plate 15, suspension stage 18 is compressed (shown in the FIGURE). A clearance limiter, for example a chain 20, connecting base 13 and plate 15, limits the opening of the suspension stage 18 when the fifth wheel is unloaded.

As a result of the direct connection of fifth wheel 9 to the axle of the tractor, frame 1 of this tractor is insulated from the undesirable movements of the semitrailer. It is seen that any load, static or dynamic, exerted by the semitrailer on the fifth wheel has no direct action on the frame. In this way, the load supported by rear springs 6 of the tractor does not vary and it is thus possible, as a result of the reduction of the load on the tractor, to improve the comfort level within this vehicle in the unloaded state.

The role of suspension stage 18 is to provide the suspension of the main weight resting on support element 12 and consisting of the front part of semitrailer 10.

The tractor no longer directly carries the load, but on the other hand, it still pulls it and the tractive forces are picked up by links 8 and arms 14.

The tractor is connected to wheels 3 by suspension elements 5. It is interesting to note that these suspension elements do not support the weight of the load; they will therefore be more flexible, which leads to better comfort both when empty and when loaded. A better vibratory insulation for all the accessories fastened to the frame is also achieved and a constant stable position of the vehicle is provided, which is shown by a better operation of the kinematic linkage consisting of the transmission, the driving axle and the steering of the tractor.

This connection according to the invention further makes possible the elimination of the cab suspension of the tractor.

Thus, the connecting device according to the invention can be credited with:

1. An improved dynamic behavior of the loaded tractor, as a result of the insulation from the inertial movements of the seimtrailer;

2. A better comfort when empty, as a result of the constant load supported by the tractor;

3. The possibility of eliminating the suspension of the cab of the tractor, the comfort being nevertheless greater than that of a cab with a flexible suspension (1 Hz of bounce frequency);

4. Among the secondary advantages, the reduction of the bending moment of the frame and also an increase of the maximum load of the rear springs.

Of course, the invention is not limited to the embodiments described and shown, and it is capable of numerous variants, known to those skilled in the art, without deviating from the spirit of the invention.

Thus, it is understood that the structure for supporting support element 12 of semitrailer 10 includes a transverse hinge pin 12a on which is connected a coupling plate that supports plate 10a of the gooseneck of semitrailer 10 and that receives the coupling hook (not shown) of the semitrailer.

Also, base 13 of fifth wheel 9 fastened rigidly to axle 2, is connected to frame 1 of the tractor by arms 14, while axle tubes 2a of axle 2 are each connected by at least a link 8 to the frame of the tractor, arms 14 and links 8 being arranged approximately parallel to one another and parallel to the general axis of frame 1 in its middle position, so as to constitute a parallelogram for connection of the unit of fifth wheel 9 and axle 2 to frame 1 of the tractor, said parallelogram being able to transmit to frame 1 the resultant torques and forces exerted by axle 2 and by semitrailer 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tractor for a tractor-semitrailer combination, said tractor comprising:
    a tractor frame;
    a rear tractor axle;
    suspension means, including spring means, connected between said rear axle and said frame for supporting said frame and a first link connected to said spring means and articulated to said frame in front of said rear axle;
    a fifth wheel adapted for supporting a complementary support element for a semitrailer; and
    means for directly supportingly connecting said fifth wheel to said rear axle, whereby said fifth wheel is directly supported by said rear axle, wherein said means for directly supportingly connecting comprise:
    (a) means for positioning said fifth wheel substantially directly above said rear axle; and
    (b) at least one generally vertically extending support column fixed between said fifth wheel and said rear axle and passing through said frame for supporting said rear axle, wherein said means for positioning said fifth wheel comprise an arm above each said first link and extending substantially parallel to said first link, each said arm being articulated between said fifth wheel and said frame.

2. The tractor of claim 1 wherein said fifth wheel comprises:
    a base fixed to said at least one support column;
    a fifth wheel plate for directly supporting said semitrailer support element;
    means for pivoting said fifth wheel plate to said base about an axis extending parallel to said rear axle; and
    a suspension stage positioned between said fifth wheel plate and said base.

3. The tractor of claim 1 wherein said suspension means further comprise at each end of said rear axle:
    a small link articulated to said frame behind said rear axle; and
    a half leaf spring comprising said spring means and having one end articulated to said small link and a second end connected to said first link.

4. The tractor of claim 1 wherein said first links are articulated to a tube of said rear axle and extend parallel to a longitudinal axis of said frame, whereby said first links and said arms define a parallelogram for connecting a unit defined by said fifth wheel and rear axle tube to said frame so that torques are transferred from said rear axle and semitrailer to said frame.

* * * * *